United States Patent Office 2,889,229
Patented June 2, 1959

2,889,229

PROCESS FOR THE MANUFACTURE OF FIRE RESISTANT MATERIAL CONTAINING SILICATES

Eduard Steinhoff, Wiesbaden-Biebrich, Germany, assignor to Didier-Werke A.G., Wiesbaden, Germany No Drawing. Application March 2, 1955
Serial No. 491,773

Claims priority, application Germany March 5, 1954

6 Claims. (Cl. 106—57)

The present invention relates to the manufacture of fire-resistant bricks and the like containing silicic acid. It is directed to the manufacture of a fireproof substance by mixing fused quartz and zirconium silicate, from which bricks and the like can be formed for use in the fired or unfired condition for the construction of industrial furnaces.

Quartz and zirconium silicate contain only a minor amount of melting point decreasing fluxing material especially only minor amounts of alumina. In these initial substances the amount of melting point decreasing fluxing material does not exceed .2% for fused quartz and .4% for zirconium silicate. Thus, because of their purity, these initial substances already have a good resistance to high temperatures. In addition, zirconium silicate occurs initially in practically a completely crystalline condition, while quartz crystallizes when subjected to high temperature.

A mixture of fused quartz at a temperature of 1475° C. and zirconium silicate completely cement when they are heated together. At high temperatures in the range of 1600° C. a strong recrystallizing and a collective crystallization of the zirconium silicate occurs, whereby the cristobalite formed from the quartz, is bound in a network of the crystallized zirconium silicate. Thereby a compact structure of the mass of fire resistant material is obtained.

Bricks manufactured from the mixture of fused quartz with zirconium silicate remain at practically constant volume when subjected to firing during manufacture, and they do not expand when heated after completion. They have an extremely small glass phase, which can be disregarded for practical purposes. During heating beyond the melting point of the pure cristobalite no melting or disintegrating of the brick occurs because of the high viscosity of the melted fused quartz, which is contained in a network of highly fire resistant zirconium silicate. The fire resistance of the mass is therefore very high, being about 50° C. above the best silica brick. Bricks manufactured according to the present invention can thus withstand higher working temperatures, so that furnaces or furnace parts constructed with such bricks are more efficient than furnaces constructed with heretofore known bricks.

The present invention likewise results in an increase in efficiency for furnaces requiring a lining of acid bricks, where basic bricks having great fire resistance could not be used because of contaminating the material being heated therein, for instance glass.

The process according to the invention comprises intimately mixing granulated fused quartz with a finely crushed zirconium silicate. By fused quartz is meant vitreous $SiO_2$, produced by melting crystalline quartz and its modifications, e.g. tridymite, cristobalite etc. and subsequent cooling of the melt resulting in its solidification into vitreous $SiO_2$. The finely ground or powdered zirconium silicate must have a particle size less than the smallest grain size of the fused quartz. The fused quartz is admixed in a uniform grain size or in several grain sizes, which may range from 0.5 to 4 mm. in diameter. Larger grains of fused quartz can also be used. The zirconium silicate on the other hand is admixed with the fused quartz in a finely ground form with a grain size of 0.1 mm. or less in diameter, and in an amount such that the fused quartz grains are practically covered by the finely powdered zirconium silicate. Zirconium silicate in amounts greater than that necessary to cover the fused quartz particles can have a larger grain size of from .1 to 4 mm. in diameter. The mixture must be formed such that a grain packing as tight as possible is obtained.

In the following example, this mixture was made:

70 parts by volume of granulated fused quartz having particles of from 0.5 to 4 mm. in diameter
30 parts by volume of powdered zirconium silicate having particles of 0.1 mm. or less in diameter.

The fused quartz particles and zirconium silicate powder were thoroughly mixed to coat the fused quartz particles with the powder. The mixture was then packed tightly into the form of bricks and fired at approximately 1600° C.

In the following example, in which not all of the zirconium silicate is powdered, this mixture was made:

40 parts by volume of granulated fused quartz having particles of from 0.5 to 4 mm. in diameter
30 parts by volume of powdered zirconium silicate having particles of 0.1 mm. or less in diameter
30 parts by volume of granulated zirconium silicate having particles of from 0.1 to 4 mm. in diameter.

The mixture was again thoroughly mixed and tightly packed into bricks which were fired at about 1600° C. The bricks which resulted had a thermal expansion at 1000° C. of only 0.85% as compared to 1.3 to 1.4% in the case of silica bricks. The bricks did not show any expansion after being finished, and in a pressure softening test had a softening interval of 70° C. between 1680° C. and 1750° C.

The proportions of the mixture of fused quartz and zirconium silicate having various particle sizes can be determined by the purpose for which the mixture or the bricks made therefrom are to be used. It is possible on one hand to use up to 90% by volume of fused quartz, or on the other hand to use up to 90% of zirconium silicate.

However, where less than 20% zirconium silicate is used, there can be added a finely ground binding and neutralizing agent, such as lime. No alumina should be added to the binding agent, since it causes the formation of a low melting glass phase. Where a volume of lime up to 3% of the mixture is used, an additional fastening between the lime and the silicates results by dry sintering, i.e. reacting the substances with each other in their solid state without melting and in the absence of a fluid, the mixture at a lower temperature than 1600° C.

An example of a mixture containing a lime binder follows:

80 parts by volume of granulated fused quartz having particles of from 0.5 to 4 mm. in diameter
17 parts by volume of powdered zirconium silicate having particles of 0.1 mm. or less in diameter
3 parts by volume of finely ground lime.

The mixture was thoroughly mixed and pressed into bricks which were fired at about 1450° C. The coarse grains of fused quartz, having an inert devitrification tendency, i.e. will devitrify very slowly, still remain fused quartz after the firing at 1450° C. Such bricks have a very low thermal expansion not exceeding 0.3% at 1000° C., and on heating to a temperature of between 200 and 300° C. they show practically no cristobalitic effect, since no cristobalite is present in the finished brick, so that they are resistant to changes in temperature. The bricks therefore can stand sudden heat without suffering any damage because of a breaking off or cracking of the brick structure. They are especially adapted for use in heating repair work on industrial furnaces.

For a better retaining of the shape of the bricks in unburnt condition, a binding agent which is adapted to help retain their form and which will burn up during firing, for example sulfite waste liquor can be added to the substance.

Bricks manufactured according to the present invention are especially suitable for glass melting furnaces for Siemens-Martin furnaces, electro furnaces, etc., and particularly for the arched part of such furnaces. Since the bricks do not expand appreciably after they are completed and the thermal expansion is low, the wide expansion joints needed when other construction material, i.e. silica bricks, is used can be reduced to a very small dimension. They can be eliminated in smaller brick work dimensions. This results in a considerable advantage in the furnace construction technique.

Similarly, the mixture can be used in its mixture form for parts of furnaces which cannot be bricked. The absence of tensions in the structure even after temperature drops makes the bricks especially suitable for Siemens-Martin furnaces, where the bricks remain free of tension in the hot heads as well as in the cooler arched parts.

It is thought that the invention and its advantages will be understood from the foregoing description and it is apparent that various changes may be made in the process, form, construction and arrangement of the parts without departing from the spirit and scope of the invention or sacrificing its material advantages, the forms hereinbefore described and illustrated being merely preferred embodiments thereof.

I claim:

1. A process for the manufacture of refractory articles containing silicic acid comprising preparing a thoroughly mixed mixture consisting of from 10 to 90 parts by volume of granular fused quartz having grains ranging from 0.5 mm. to 4 mm. in diameter with from 90 to 10 parts by volume of powdered zirconium silicate having grains of from less than 0.1 mm. to 4 mm. in diameter, pressing the mixture into the shape of a finished article, and firing the pressed mixture at a temperature of at least 1450° C.

2. A process as claimed in claim 1 in which 30 parts by volume of zirconium silicate have a grain size of less than 0.1 mm. and the zirconium silicate in excess of 30 parts by volume has a grain size of from 0.1 to 4 mm.

3. A process for the manufacture of refractory materials containing silicic acid comprising preparing a thoroughly mixed mixture consisting of from 10 to 90 parts by volume of granular fused quartz having grains ranging from 0.5 mm. to 4 mm. in diameter with from 90 to 10 parts by volume of powdered zirconium silicate having grains of from less than 0.1 mm. to 4 mm. in diameter, forming the mixture into a shape which it is desired that the material will have after firing, and firing the formed mixture at a temperature of at least 1450° C.

4. A process as claimed in claim 3 in which at least 20 parts by volume of zirconium silicate are mixed with said fused quartz.

5. A process for the manufacture of refractory articles containing silicic acid comprising preparing a thoroughly mixed mixture consisting of from 10 to 90 parts by volume of granular fused quartz having grains ranging from 0.5 mm. to 4 mm. in diameter with from 90 to 10 parts by volume of powdered zirconium silicate having grains of from less than 0.1 mm. to 4 mm. in diameter, mixing with said mixture 3% by weight of hydrate of lime, pressing the mixture into the shape of a finished article, and firing the pressed mixture at a temperature of at least 1450° C.

6. A mixture for use in the manufacture of formed refractory material, consisting essentially of from 10 to 90 parts by volume of granular fused quartz having grains ranging from 0.5 mm. to 4 mm. in diameter mixed with from 90 to 10 parts by volume of powdered zirconium silicate having grains of from less than 0.1 mm. to 4 mm. in diameter.

References Cited in the file of this patent

UNITED STATES PATENTS

| | | |
|---|---|---|
| 1,440,657 | Buckman et al. | Jan. 2, 1923 |
| 1,696,688 | Peiler | Dec. 25, 1928 |
| 1,882,701 | Alley | Oct. 18, 1932 |
| 1,886,249 | Bensing | Nov. 1, 1932 |
| 2,087,107 | Heuer | July 13, 1937 |
| 2,567,088 | Teasel | Sept. 4, 1951 |

FOREIGN PATENTS

| | | |
|---|---|---|
| 543,021 | Great Britain | 1942 |